US010839560B1

United States Patent
Goesele et al.

(10) Patent No.: US 10,839,560 B1
(45) Date of Patent: Nov. 17, 2020

(54) MIRROR RECONSTRUCTION

(71) Applicant: Facebook Technologies, LLC, Menlo Park, CA (US)

(72) Inventors: Michael Goesele, Darmstadt (DE); Julian Straub, Seattle, WA (US); Thomas John Whelan, Macroom (IE); Richard Andrew Newcombe, Seattle, WA (US); Steven John Lovegrove, Woodinville, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 82 days.

(21) Appl. No.: 16/286,388

(22) Filed: Feb. 26, 2019

(51) Int. Cl.
*G06K 9/00* (2006.01)
*G06T 7/00* (2017.01)
*G06T 7/73* (2017.01)
*G06T 17/10* (2006.01)
*G06T 15/50* (2011.01)
*G06T 15/06* (2011.01)

(52) U.S. Cl.
CPC ............... *G06T 7/97* (2017.01); *G06T 7/73* (2017.01); *G06T 15/06* (2013.01); *G06T 15/50* (2013.01); *G06T 17/10* (2013.01)

(58) Field of Classification Search
CPC .. G06T 7/97; G06T 7/73; G06T 15/06; G06T 15/50; G06T 17/10
USPC ........................................ 382/154, 106, 286
See application file for complete search history.

(56) References Cited

U.S. PATENT DOCUMENTS

| 6,957,775 B2* | 10/2005 | Tsikos | G06K 7/10722 235/462.01 |
| 2003/0052169 A1* | 3/2003 | Tsikos | G06K 9/26 235/454 |
| 2013/0083969 A1* | 4/2013 | Tsukada | G06K 9/00 382/103 |
| 2013/0307932 A1* | 11/2013 | Mestha | G06K 9/00201 348/46 |
| 2013/0339043 A1* | 12/2013 | Bakar | G06Q 50/22 705/2 |
| 2014/0177914 A1* | 6/2014 | Kuehnle | G06T 7/60 382/103 |
| 2014/0240511 A1* | 8/2014 | Nystrom | H04N 5/33 348/164 |
| 2015/0078642 A1* | 3/2015 | Fang | G06T 15/00 382/131 |
| 2015/0187082 A1* | 7/2015 | Bernal | G06T 7/521 382/154 |

(Continued)

Primary Examiner — Marceau Milord
(74) *Attorney, Agent, or Firm* — Baker Botts L.L.P.

(57) ABSTRACT

In one embodiment, a method includes accessing a digital image captured by a camera that is connected to a machine-detectable object, detecting a reflection of the machine-detectable object in the digital image, computing, in response to the detection, a plane that is coincident with a reflective surface associated with the reflection, determining a boundary of the reflective surface in the plane based on at least one of a plurality of cues, and storing information associated with the reflective surface, where the information includes a pose of the reflective surface and the boundary of the reflective surface in a 3D model of a physical environment, and where the information associated with the reflective surface and the 3D model are configured to be used to render a reconstruction of the physical environment.

20 Claims, 7 Drawing Sheets

(56) References Cited

U.S. PATENT DOCUMENTS

2019/0025049 A1\* 1/2019 Doge ...................... G01S 17/48
2020/0143554 A1\* 5/2020 Toldo ...................... G06T 7/593

\* cited by examiner

MIRROR RECONSTRUCTION

TECHNICAL FIELD

This disclosure generally relates to artificial reality systems, and in particular, related to detecting a reflective surface in a three-dimensional scan.

BACKGROUND

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, a computing device may detect a reflective surface automatically in a three-dimensional (3D) scan based on a reflected image of a machine-detectable object. Reconstructing planar reflective surfaces including mirrors and glasses may be difficult for most current 3D scanning techniques. Without detecting a reflective surface properly, the reflective surface may introduce duplicate scene structures. In some situations, an object reflected by a mirror would be reconstructed as an object positioned behind the mirror. A scanning device may comprise an attached machine-detectable object. A computing device associated with the scanning device may conclude that a reflective surface is being observed if a camera of the scanning device captures a reflective image of the machine-detectable object in an image. Knowing that a reflective surface is being observed, the computing device may estimate a plane in which the reflective surface resides based on information regarding the detected reflected machine-detectable object in the image.

In particular embodiments, a machine-detectable object may be attached to the scanning device in such a way that a detected reflection of the machine-detectable object may indicate that the scanning device is scanning a reflective surface. In particular embodiments, the machine-detectable object may emit light diffusely at a luminance level similar to the scene (e.g., by using a backlit light). The scanning device may capture the reflected image of the machine-detectable tag using one or more attached cameras. The one or more attached cameras may comprise an RGB camera or an infrared camera. In particular embodiments, the computing device, for each captured frame from the scanning device, may check whether the frame captures a reflection of the machine-detectable object that is attached to the scanning device. The detection of reflection may indicate that a reflective planar surface is being observed. In particular embodiments, a pattern may be encoded within the machine-detectable object. The computing device may perform image processing for local intensity normalization to detect candidate locations as continuous bright regions containing a dark region. The computing device may extract the edges and corners of the dark square region to identify the pattern encoded in the machine-detectable object. The computing device may determine whether the perceive pattern matches the known pattern of the machine-detectable object. The output of the detection may comprise the ordered positions of the four corners and the center of the machine-detectable object, an identifier of the detected pattern. The output of the detection may further comprise additional information about a quality of the detection.

In particular embodiments, the computing device may compute a plane that is coincident with the reflective surface. The plane may be referred to as a mirror plane. The computing device may determine a relative orientation between the camera and the machine-detectable object. The mirror plane may be computed based on followings: (1) a fact that the plane may bisect the corresponding real and virtual corner locations of the machine-detectable object; (2) a fact that an angle of a ray incident to the plane equals an angle of the ray reflected by the mirror plane; (3) the relative orientation between the camera and the machine-detectable object; (4) other known calibration parameters of the capturing device. The computing device may detect a mirror plane with a single image containing a reflected machine-detectable object. The computing device may transfer the observation information to all other frames using the scene geometry and Simultaneous Localization And Mapping (SLAM) poses. Observing the reflected machine-detectable object in additional frames may increase an accuracy of estimating the mirror plane and may increase an accuracy of detecting a boundary of the reflective surface.

In particular embodiments, the computing device may detect a boundary of each reflective surface based on the following 8 cues: discontinuities, occlusion, geometry, free-space, intensity variance, mean intensity gradient, detection, and Average Zero-Mean Normalized Cross-Correlation (ZNCC).

In particular embodiments, a reflective surface may be a fully-reflective surface (e.g., a mirror) or a semi-reflective surface (e.g., a glass plane). The computing device may determine that a reflective surface is a semi-reflective surface if an intensity of a reflected machine-detectable object is darker than a threshold. In particular embodiments, the computing device may determine a reflective surface is a semi-reflective surface if two reflections are detected on the reflective surface: one at a front of the surface and one at a back of the surface. A thickness of the semi-reflective surface may be estimated based on the distance of the two reflections.

In particular embodiments, the computing device may store the physical location and orientation of a reflective surface and label the surface as being a mirror or a glass after the computing device has determined such information. A rendering device may render the identified surface using standard rendering techniques including a ray tracing when the rendering device reconstructs a virtual replica of the scanned physical environment.

The computing device may access a digital image captured by a camera that is connected to a machine-detectable object. The computing device may detect a reflection of the machine-detectable object in the digital image. The computing device may compute, in response to the detection, a plane that is coincident with a reflective surface associated with the reflection. The plane may be computed based on at least the reflection of the machine-detectable object in the digital image and a relative orientation between the camera and the machine-detectable object. The computing device may determine a boundary of the reflective surface in the plane based on at least one of a plurality of cues. The computing device may store information associated with the reflective surface. The information may comprise a pose of the reflective surface and the boundary of the reflective surface in a 3D model of a physical environment. The information associated with the reflective surface and the 3D model may be configured to be used to render a reconstruction of the physical environment.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
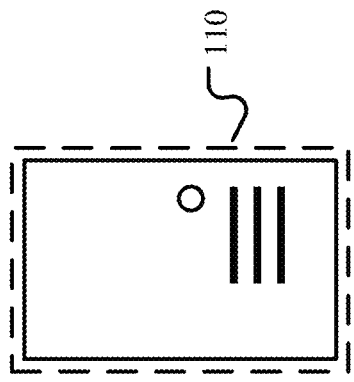
FIG. 1 illustrates an example configuration for a three-dimensional (3D) scanning.
Figure 1:
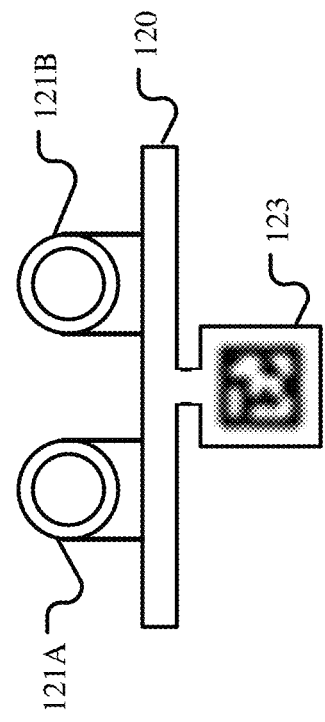

In particular embodiments, a computing device may access a digital image captured by a camera that is connected to a machine-detectable object. The camera may be associated with a scanning device that captures a series of images of a 3-dimensional area with one or more cameras. The one or more cameras may comprise an infrared camera or an RGB camera. The machine-detectable object may comprise a tag with encoded unique patterns. In particular embodiments, the computing device may detect a reflection of the machine-detectable object in the digital image. The computing device may first identify candidate locations for the reflection of the machine-detectable object in the digital image by performing an image processing on the received digital image. The computing device may then determine, for each candidate location, whether a reflection of the machine-detectable object exists in the location. The computing device may detect only reflected images of the machine-detectable object. The computing device may determine one or more locations of the reflection of the machine-detectable object within the image. Each of the one or more locations of the reflection may be represented by one or more identifiable points of the reflection of the machine-detectable object. The one or more identifiable points may comprise four corners and a center of the reflection of the machine-detectable object. The one or more locations determine a location and an orientation of the reflection of the machine-detectable object. The computing device may also determine additional information associated with a quality of the detection. In particular embodiments, the computing device may compute, in response to the detection, a plane that is coincident with a reflective surface associated with the reflection. The plane may be computed based on at least the reflection of the machine-detectable object in the digital image and a relative orientation between the camera and the machine-detectable object. The computing device may determine a relative position of the machine-detectable object from the camera, wherein the position of the machine-detectable object comprises ordered-positions of four corners and a position of center of the machine-detectable object. The computing device may compute a plane that bisects each identifiable point of the real machine-detectable object and a corresponding detected point of the reflected machine-detectable object. The identifiable point may comprise any of four corners or a center. In particular embodiments, the computing device may determine a boundary of the reflective surface in the plane based on at least one of a plurality of cues. The plurality of cues may comprise discontinuities, occlusion, geometry, free-space, intensity variance, mean intensity gradient, detection, and average zero-mean normalized cross-correlation (ZNCC). In particular embodiments, the computing device may store information associated with the reflective surface. The information may comprise a pose of the reflective surface and the boundary of the reflective surface in a 3D model of a physical environment. The information associated with the reflective surface and the 3D model may be configured to be used to render a reconstruction of the physical environment. A rendering device may render a virtual replica of the physical environment on the reflective surface based on the 3D model using ray tracing techniques. In particular embodiments, a reflective surface may be a fully-reflective surface or a semi-reflective surface. The computing device may determine a reflective surface is a semi-reflective surface if an intensity of the detected reflection is darker than a threshold intensity. In particular embodiments, the computing device may determine a reflective surface is a semi-reflective surface if two reflections are detected on the reflective surface. One of the two reflections may be reflected at a front of the surface, and the other of the two reflections may be reflected at a back of the surface. The computing device may estimate a thickness of the semi-reflective surface based on a distance of the two reflections. Although this disclosure describes detecting a reflective surface in a three-dimensional scan in a particular manner, this disclosure contemplates detecting a reflective surface in a three-dimensional scan in any suitable manner.

FIG. 1 illustrates an example configuration for a three-dimensional (3D) scanning. A scanning device 120 may comprise one or more cameras 121A, 121B and a machine-detectable object 123. The machine-detectable object 123 may comprise a tag with encoded unique patterns. The tag may comprise an AprilTag. In particular embodiments, the machine-detectable object 123 may emit light diffusely at a luminance level similar to the scene (e.g., by using a backlit light). The one or more cameras 121A, 121B may comprise an infrared camera or an RGB camera. The scanning device 120 may capture a series of images of a 3D area with the one or more cameras 121A, 121B to scan the area from various view-points. Each image may contain a part of the 3D area taken from a view-point. The captured images may be transferred to a computing device 110 that may analyze each of the captured images to construct a 3D model for the scanned 3D area. Although this disclosure describes a particular configuration for a 3D scanning, this disclosure contemplates any suitable configuration for the 3D scanning.

Figure 2:
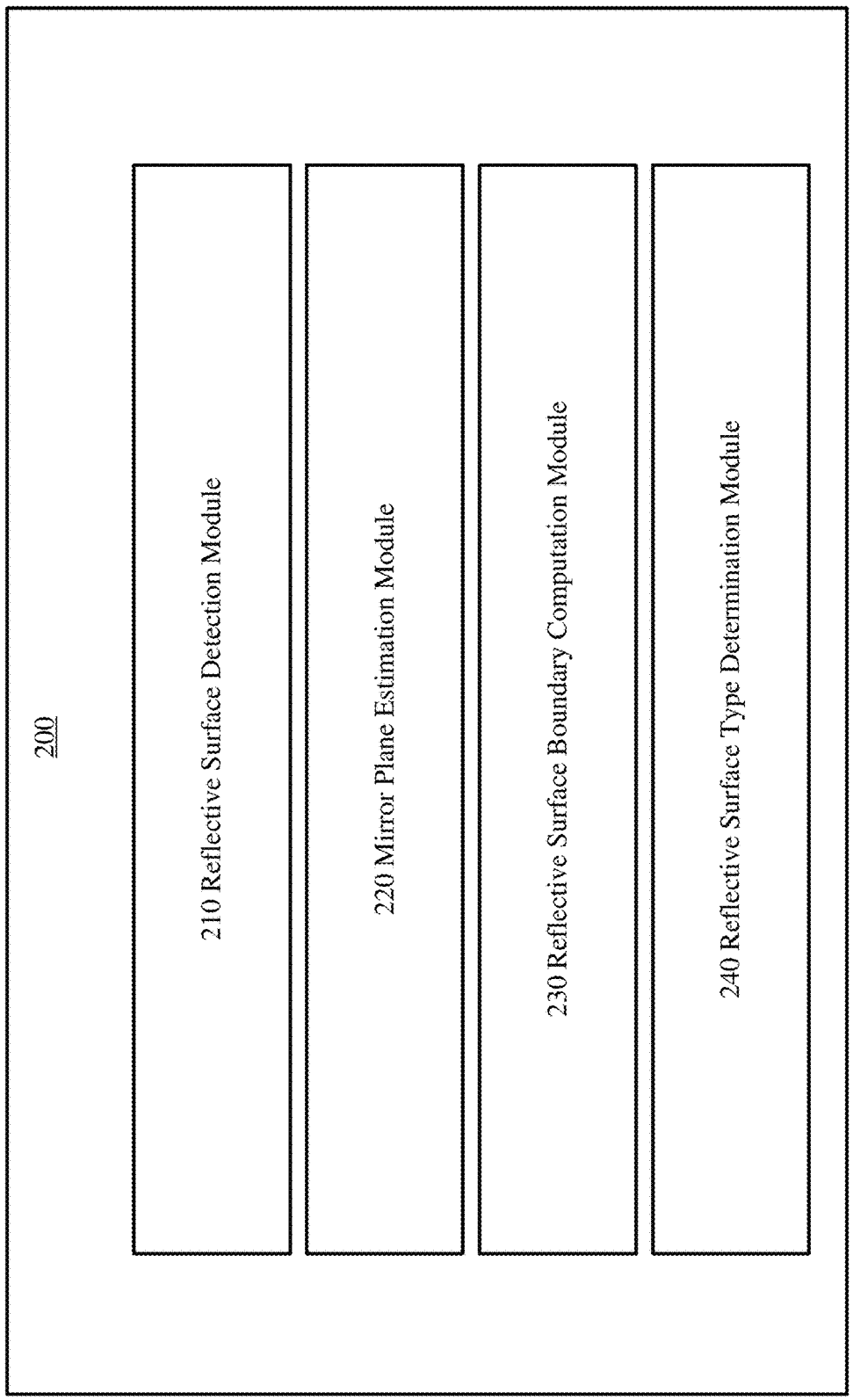
FIG. 2 illustrates an example architecture of the computing device for detecting a reflective surface in an image.

In particular embodiments, the computing device 110 may access a digital image captured by a camera 121A that is connected to a machine-detectable object 123. The camera 121A may be associated with a scanning device 120 that may capture a series of images of a 3D area with one or more cameras 121A, 121B. The one or more cameras 121A, 121B may comprise an infrared camera or an RGB camera. The computing device 110 may analyze each image through a series of logical modules to detect a reflective surface in the image. FIG. 2 illustrates an example architecture of the computing device 110 for detecting a reflective surface in an image. The logical architecture 200 may comprise a reflective surface detection module 210, a mirror plane estimation module 220, a reflective surface boundary computation module 230, and a reflective surface type determination module 240. The reflective surface detection module 210 may detect an existence of a reflective surface by detecting a reflection of the machine-detectable object in an image. The reflective surface detection module 210 may determine a location of the reflection of the machine-detectable object. The mirror plane estimation module 220 may compute a plane that is coincident with the reflective surface associated with the reflection. The reflective surface boundary computation module 230 may determine a boundary of the reflective surface in the plane. The reflective surface type determination module 240 may determine whether a reflective surface is a fully-reflective surface or a semi-reflective surface. Although this disclosure describes a particular logical architecture of the computing device for detecting a reflective surface in an image, this disclosure contemplates any suitable logical architecture of the computing device for detecting a reflective surface in an image.

Figure 3:
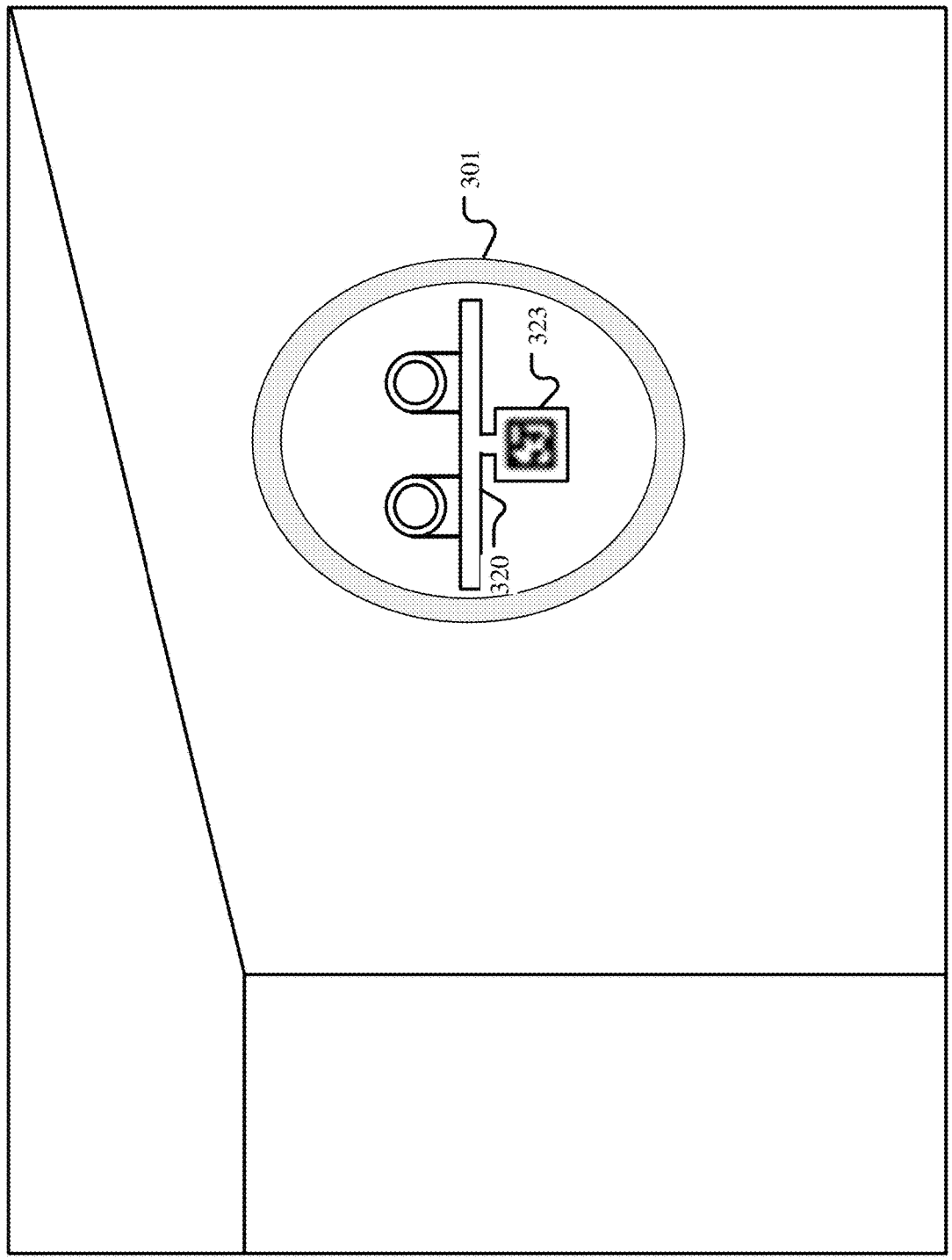
FIG. 3 illustrates an example reflection of a scanning device in a reflective surface.

In particular embodiments, the computing device 110 may detect a reflection of the machine-detectable object 123 in the digital image. The computing device 110 may first identify candidate locations for the reflection of the machine-detectable object 123 in the digital image by performing an image processing on the received digital image. The computing device 110 may perform image processing for local intensity normalization to detect candidate locations as continuous bright regions containing a dark region. The computing device 110 may then determine, for each candidate location, whether a reflection of the machine-detectable object 123 exists in the location. The computing device 110 may extract the edges and corners of the dark square region to identify the pattern encoded in the machine-detectable object 123. The computing device 110 may detect only reflected pattern encoded in the machine-detectable object. The computing device 110 may determine one or more locations of the reflection of the machine-detectable object within the image. Each of the one or more locations of the reflection may be represented by one or more identifiable points of the reflection of the machine-detectable object. The one or more identifiable points may comprise four corners and a center of the reflection of the machine-detectable object. The one or more locations determine a location and an orientation of the reflection of the machine-detectable object. The computing device may also determine additional information associated with a quality of the detection. FIG. 3 illustrates an example reflection of a scanning device in a reflective surface. As an example and not by way of limitation, illustrated in FIG. 3, a scanning device 120 may scan an indoor room, where a mirror 301 is on a wall. When the scanning device 120 captures an image of an area that includes the mirror 301 using one or more cameras 121A, 121B, a reflection 320 of the scanning device 120 may be captured in the image. A reflection 323 of the attached machine-detectable object 123 may also be captured in the image. The patterns in the reflection 323 of the machine-detectable object 123 may be flipped, where the computing device 110 may be configured to detect only the patterns in the reflection 323. The computing device 110 may perform an image processing on the image to identify candidate locations for the reflection 323. The computing device 110 may, for each identified candidate location, determine whether a reflection 323 exists in the location. Once determined that a reflection 323 of the machine-detectable object exist in a location, the computing device 110 may determine exact location of each corner and a center of the reflection 323 of the machine-detectable object 123. In particular embodiments, the computing device 110 may also determine a quality of the detection. Although this disclosure describes detecting a reflection of the machine-detectable object in an image in a particular manner, this disclosure contemplates detecting a reflection of the machine-detectable object in an image in any suitable manner.

Figure 4:
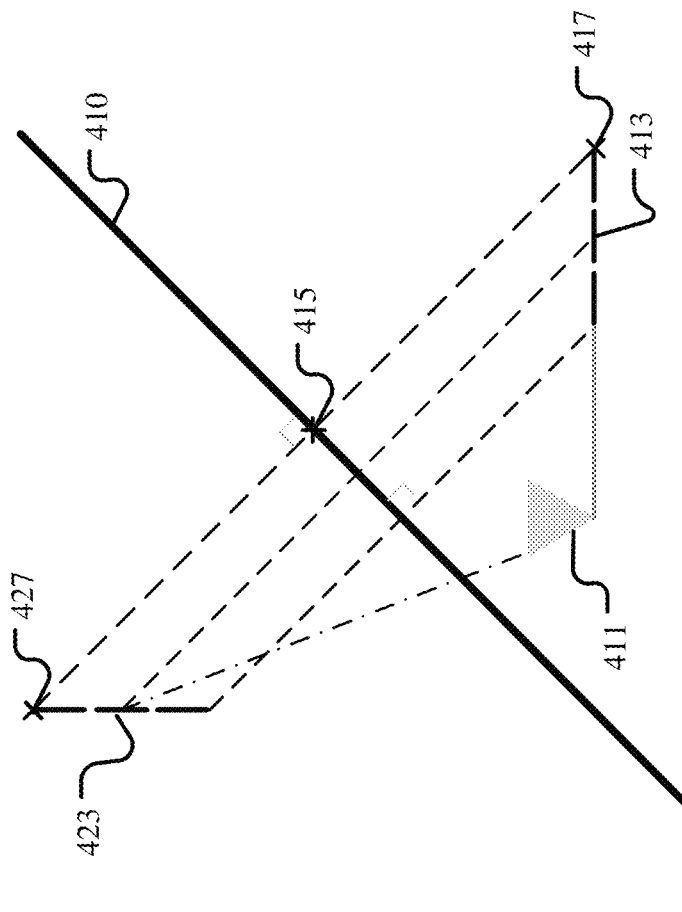
FIG. 4 illustrates an example mirror plane estimation based on a single image with a reflection of a machine-detectable object.
Figure 5D:
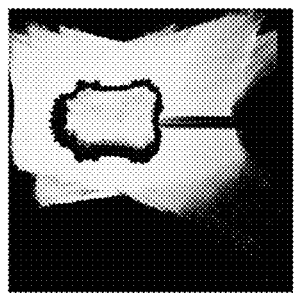
FIGS. 5A-5H illustrate example feature channels for detecting a boundary of a reflective surface.
Figure 5C:
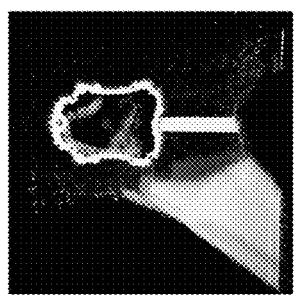
Figure 5B:
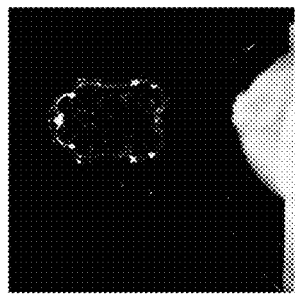
Figure 5A:
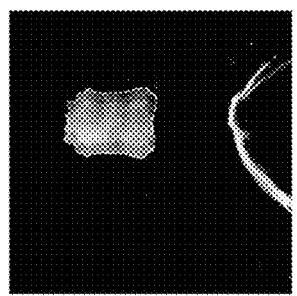
Figure 5H:
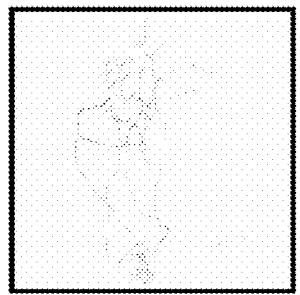
Figure 5G:
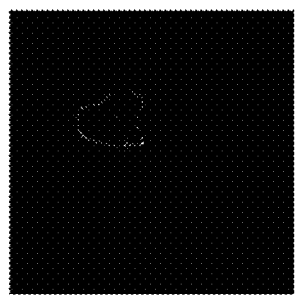
Figure 5F:
Figure 5E:
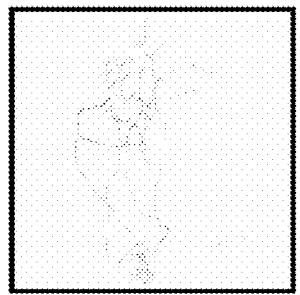

In particular embodiments, the computing device 110 may compute, in response to the detection, a plane that is coincident with a reflective surface associated with the reflection 323. The plane may be referred to as a mirror plane. The mirror plane may be computed based on followings: (1) a fact that the plane may bisect the corresponding real and virtual corner locations of the machine-detectable object; (2) a fact that an angle of a ray incident to the plane equals an angle of the ray reflected by the mirror plane; (3) the relative orientation between the camera and the machine-detectable object 123; and (4) other known calibration parameters of the capturing device. The plane may be computed based on at least the reflection of the machine-detectable object in the digital image and a relative orientation between the camera and the machine-detectable object. The computing device 110 may determine a relative position of the machine-detectable object 123 from the camera 121A that captures the image, wherein the position of the machine-detectable object 123 comprises ordered-positions of four corners and a position of center of the machine-detectable object 123. The computing device 110 may compute a plane that bisects each identifiable point of the real machine-detectable object 123 and a corresponding detected point of the reflected machine-detectable object 323. The identifiable point may comprise any of four corners or a center. The computing device 110 may detect a mirror plane with a single image containing a reflected machine-detectable object 323. The computing device may transfer the observation information to all other frames using the scene geometry and Simultaneous Localization And Mapping (SLAM) poses. Observing the reflected machine-detectable object in additional frames may increase an accuracy of estimating the mirror plane and may increase an accuracy of detecting a boundary of the reflective surface. FIG. 4 illustrates an example mirror plane estimation based on a single image with a reflection of a machine-detectable object. As an example and not by way of limitation, illustrated in FIG. 4, the computing device 110 may detect a reflection 423 of a machine-detectable object in an image. The reflection 423 of the machine-detectable object may be referred to as a virtual machine-detectable object. The computing device 110 may determine identifiable points 427 of the virtual machine-detectable object 423. The identifiable points 427 may comprise four corners and a center of the virtual machine-detectable object 423. The computing device 110 may determine a relative position of the real machine-detectable object 413 from the camera 411 that captures the image based on calibration parameters. The computing device 110 may determine identifiable points 417 of the real machine-detectable object 413 based on the determined relative position. The computing device 110 may, for each identifiable point 417 of the real machine-detectable object 413 and its corresponding identifiable point 427 of the virtual machine-detectable object 423, compute a bisection point 415 that bisects a virtual line between the identifiable point 417 of the real machine-detectable object 413 and the corresponding identifiable point 427 of the virtual machine-detectable object 423. The computing device 110 may compute a plane 410 that coincident to the reflective surface by identifying a plane comprising the computed bisection points 415. Although this disclosure describes computing a plane that is coincident with a reflective surface associated with a reflection of the machine-detectable object in a particular manner, this disclosure contemplates computing a plane that is coincident with a reflective surface associated with a reflection of the machine-detectable object in any suitable manner.

In particular embodiments, the computing device 110 may determine a boundary of the reflective surface in the plane based on at least one of a plurality of cues. The plurality of cues may comprise discontinuities, occlusion, geometry, free-space, intensity variance, mean intensity gradient, detection, and average zero-mean normalized cross-correlation (ZNCC). FIGS. 5A-5H illustrate example feature channels for detecting a boundary of a reflective surface. All channels are shown in log-scale using the "hot" color scheme except the zero-mean normalized cross-correlation (ZNCC) channel in FIG. 5H. ZNCC channel is displayed from −1 in blue to 1 in red. The features in FIG. 5A-5D are computed from the depth image. The discontinuities channel in FIG. 5A may indicate the mirror boundary. The occluding in FIG. 5B, geometry in FIG. 5C and free-space in FIG. 5D may indicate structures in front of, right around, and behind the reflective surface. A reflective surface may create sudden and drastic depth discontinuities at the border between the reflected scene in the reflective surface and the frame for framed reflective surfaces. Frameless reflective surfaces may create a depth discontinuity between the reflective scene in the reflective surface and a scene outside the reflective surface. The computing device 110 may determine the boundary of the reflective surface based on depth discontinuities. A certain type of frame may cause a structure appears in front of a reflective surface plane. The computing device 110 may determine the boundary of the reflective surface based on identified occlusions. One or more geometric structures may be a part of the boundary of a reflective surface. The computing device 110 may determine the boundary of the reflective surface based on identified geometric structures. A reflected scene in the reflective surface may comprise free-space. The computing device 110 may determine the boundary of the reflective surface based on identified free-spaces. Feature channels in FIG. 5E and FIG. 5F aim to extract mirror boundary information from image intensities: high intensity variance may indicate a reflective surface and high average intensity gradient is expected at the boundary of the reflective surface. Channel Detections in FIG. 5G may accumulate the detections of the patterns in the machine-detectable object. The zero-mean normalized cross-correlation (ZNCC) channel in FIG. 5H may be computed between the average machine-detectable object appearance and the area of the predicted machine-detectable object location in the current image. The computing device 110 may determine an area is a non-reflective area if a ZNCC score for the area is lower than a threshold. Although this disclosure describes determining a boundary of the reflective surface in the plane in a particular manner, this disclosure contemplates determining a boundary of the reflective surface in the plane in any suitable manner.

In particular embodiments, a reflective surface may be a fully-reflective surface or a semi-reflective surface. A fully-reflective surface may comprise a mirror. A semi-reflective surface may comprise a glass. The computing device 110 may determine a reflective surface is a semi-reflective surface if an intensity of the detected reflection is darker than a threshold intensity. In particular embodiments, the computing device 110 may determine a reflective surface is a semi-reflective surface if two reflections are detected on the reflective surface. One of the two reflections may be reflected at a front of the surface, and the other of the two reflections may be reflected at a back of the surface. The computing device may estimate a thickness of the semi-reflective surface based on a distance of the two reflections. In particular embodiments, the computing device 110 may determine a reflective surface is a semi-reflective surface if a geometry is detected within a detected reflection of the machine-detectable object, where the detected geometry is not at the depth of the reflection of the machine-detectable object. Detection of the geometry through the reflection of the machine-detectable object may imply the geometry is visible past the reflective surface. Although this disclosure describes determining a type of a reflective surface in a particular manner, this disclosure contemplates determining a type of a reflective surface in any suitable manner.

In particular embodiments, the computing device 110 may store information associated with the reflective surface. The information may comprise a pose of the reflective surface and the boundary of the reflective surface in a 3D model of a physical environment. The information may further comprise a type of the reflective surface. The information associated with the reflective surface and the 3D model may be configured to be used to render a reconstruction of the physical environment. A rendering device may render a virtual replica of the physical environment on the reflective surface based on the 3D model using ray tracing techniques. Although this disclosure describes utilizing the information associated with a reflective surface in a particular manner, this disclosure contemplates utilizing the information associated with a reflective surface in any suitable manner.

Figure 6:
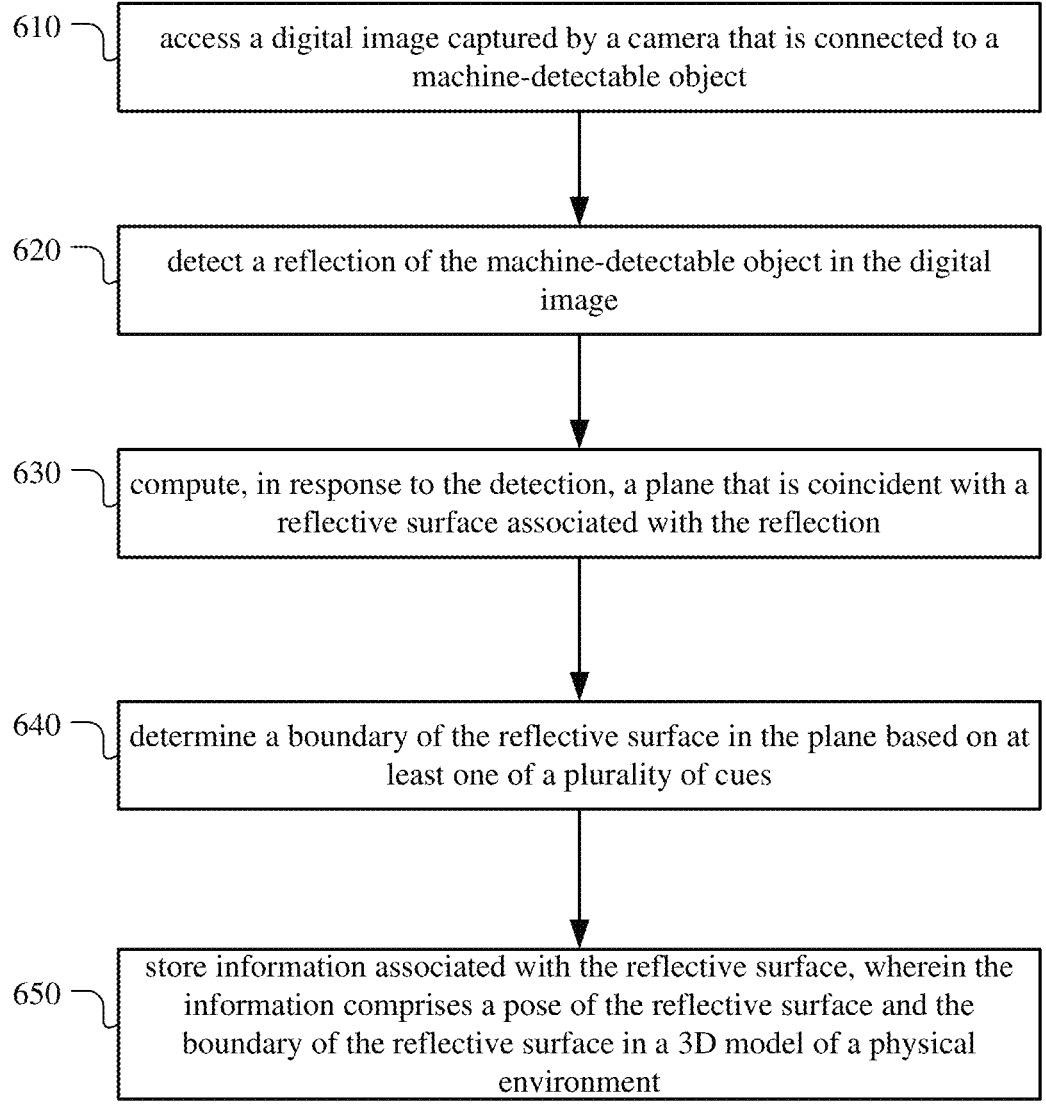
FIG. 6 illustrates an example method for detecting a reflective surface in a three-dimensional scan.

FIG. 6 illustrates an example method 600 for detecting a reflective surface in a three-dimensional scan. The method may begin at step 610, where the computing device 110 may access a digital image captured by a camera that is connected to a machine-detectable object. At step 620, the computing device 110 may detect a reflection of the machine-detectable object in the digital image. At step 630, the computing device 110 may compute, in response to the detection, a plane that is coincident with a reflective surface associated with the reflection. The plane may be computed based on at least the reflection of the machine-detectable object in the digital image and a relative orientation between the camera and the machine-detectable object. At step 640, the computing device 110 may determine a boundary of the reflective surface in the plane based on at least one of a plurality of cues. At step 650, the computing device 110 may store information associated with the reflective surface. The information may comprise a pose of the reflective surface and the boundary of the reflective surface in a 3D model of a physical environment. The information associated with the reflective surface and the 3D model may be configured to be used to render a reconstruction of the physical environment. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for detecting a reflective surface in a three-dimensional scan including the particular steps of the method of FIG. 6, this disclosure contemplates any suitable method for detecting a reflective surface in a three-dimensional scan including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
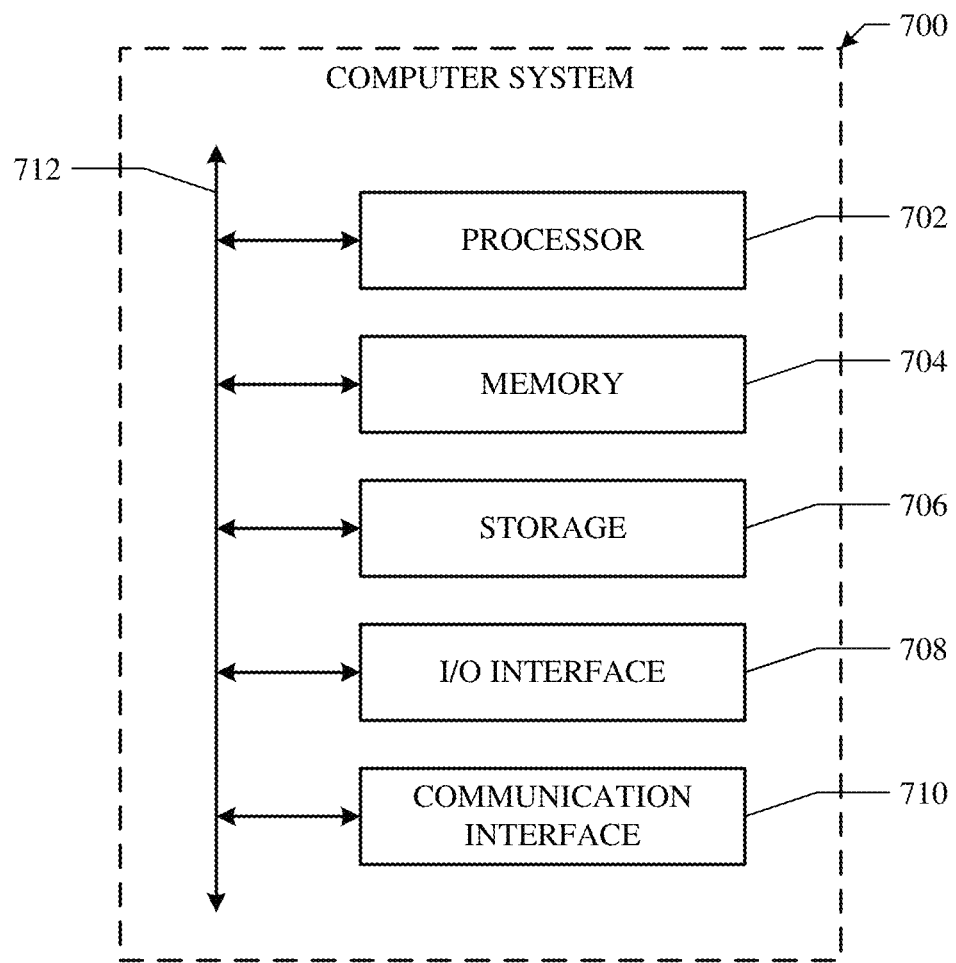
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   accessing, by a computing device, a digital image captured by a camera that is connected to a machine-detectable object;
   detecting, by the computing device, a reflection of the machine-detectable object in the digital image;
   computing, by the computing device and in response to the detection, a plane that is coincident with a reflective surface associated with the reflection, wherein the plane is computed based on at least the reflection of the machine-detectable object in the digital image and a relative orientation between the camera and the machine-detectable object;
   determining, by the computing device, a boundary of the reflective surface in the plane based on at least one of a plurality of cues; and
   storing, by the computing device, information associated with the reflective surface, wherein the information comprises a pose of the reflective surface and the boundary of the reflective surface in a 3D model of a physical environment, wherein the information associated with the reflective surface and the 3D model are configured to be used to render a reconstruction of the physical environment.

2. The method of claim 1, wherein the camera is associated with a scanning device that captures a series of images of a 3-dimensional area with one or more cameras.

3. The method of claim 2, wherein the one or more cameras comprise an infrared camera or an RGB camera.

4. The method of claim 1, wherein the machine-detectable object comprises a tag with encoded unique patterns.

5. The method of claim 1, wherein detecting the reflection of the machine-detectable object comprises:
   identifying candidate locations for the reflection of the machine-detectable object in the digital image by performing an image processing on the received digital image;
   determining, for each candidate location, whether a reflection of the machine-detectable object exists in the location, wherein the computing device detects only reflected images of the machine-detectable object; and
   determining one or more locations of the reflection of the machine-detectable object within the image, wherein the one or more locations determine a location and an orientation of the reflection of the machine-detectable object.

6. The method of claim 5, wherein detecting the reflection of the machine-detectable object further comprises determining additional information associated with a quality of the detection.

7. The method of claim 5, wherein each of the one or more locations of the reflection is represented by one or more identifiable points of the reflection of the machine-detectable object.

8. The method of claim 7, wherein the one or more identifiable points comprise four corners and a center of the reflection of the machine-detectable object.

9. The method of claim 1, wherein computing the plane that is coincident with the reflective surface associated with the reflection comprises:
   determining a relative position of the machine-detectable object from the camera, wherein the position of the machine-detectable object comprises ordered-positions of four corners and a position of center of the machine-detectable object; and
   computing a plane that bisects each identifiable point of the real machine-detectable object and a corresponding detected point of the reflected machine-detectable object.

10. The method of claim 9, wherein the identifiable point comprises any of four corners or a center.

11. The method of claim 1, wherein the plurality of cues comprises discontinuities, occlusion, geometry, free-space, intensity variance, mean intensity gradient, detection, and average zero-mean normalized cross-correlation (ZNCC).

12. The method of claim 1, wherein the reflective surface is a fully-reflective surface.

13. The method of claim 1, wherein the reflective surface is a semi-reflective surface.

14. The method of claim 13, wherein the computing device determines a reflective surface is a semi-reflective surface if an intensity of the detected reflection is darker than a threshold intensity.

15. The method of claim 13, wherein the computing device determines a reflective surface is a semi-reflective surface if two reflections are detected on the reflective surface, wherein one of the two reflections is reflected at a front of the surface, and wherein the other of the two reflections is reflected at a back of the surface.

16. The method of claim 15, wherein a thickness of the semi-reflective surface is estimated based on a distance of the two reflections.

17. The method of claim 1, wherein a rendering device renders a virtual replica of the physical environment on the reflective surface based on the 3D model using ray tracing techniques.

18. One or more computer-readable non-transitory storage media embodying software that is operable when executed to:
  access a digital image captured by a camera that is connected to a machine-detectable object;
  detect a reflection of the machine-detectable object in the digital image;
  compute, in response to the detection, a plane that is coincident with a reflective surface associated with the reflection, wherein the plane is computed based on at least the reflection of the machine-detectable object in the digital image and a relative orientation between the camera and the machine-detectable object;
  determine a boundary of the reflective surface in the plane based on at least one of a plurality of cues; and
  store information associated with the reflective surface, wherein the information comprises a pose of the reflective surface and the boundary of the reflective surface in a 3D model of a physical environment, wherein the information associated with the reflective surface and the 3D model are configured to be used to render a reconstruction of the physical environment.

19. The media of claim 18, wherein the camera is associated with a scanning device that captures a series of images of a 3-dimensional area with one or more cameras.

20. A system comprising:
  one or more processors; and
  one or more computer-readable non-transitory storage media coupled to one or more of the processors and comprising instructions operable when executed by one or more of the processors to cause the system to:
    access a digital image captured by a camera that is connected to a machine-detectable object;
    detect a reflection of the machine-detectable object in the digital image;
    compute, in response to the detection, a plane that is coincident with a reflective surface associated with the reflection, wherein the plane is computed based on at least the reflection of the machine-detectable object in the digital image and a relative orientation between the camera and the machine-detectable object;
    determine a boundary of the reflective surface in the plane based on at least one of a plurality of cues; and
    store information associated with the reflective surface, wherein the information comprises a pose of the reflective surface and the boundary of the reflective surface in a 3D model of a physical environment, wherein the information associated with the reflective surface and the 3D model are configured to be used to render a reconstruction of the physical environment.

* * * * *